Patented Dec. 12, 1944

2,364,970

UNITED STATES PATENT OFFICE 2,364,970

CATALYST PRODUCTION

Marion H. Gwynn, Mountain Lakes, N. J.

No Drawing. Application July 28, 1942,
Serial No. 452,635

7 Claims. (Cl. 252—239)

This invention relates to the production of catalysts for use in various catalytic processes such as hydrogenation, dehydrogenation, desulfurization and hydrofining, and more particularly to the preparation of bulk type catalysts.

In hydrogenation, dehydrogenation, desulfurization, etc., it is advantageous to employ metal catalysts arranged in bulk form, e. g. as assemblies of metallic particles such as nickel having catalytically active surfaces or non-metallic supports carrying a catalytically active form of the metal. Such catalysts possess the advantage over catalysts of the powder type, especially in continuous operations, in that they can be more readily uniformly distributed throughout the path of flow of reactants and more readily continuously separated from the reaction products. Moreover, bulk type catalysts are desirable for the reason that they may be prepared, reactivated, introduced into and removed from reaction chambers as masses of substantial size as distinguished from small particles thereby greatly facilitating handling of the catalysts.

Heretofore, it has been suggested to prepare hydrogenation catalysts by treating the surface of nickel with nitric acid; e. g. British Patent No. 392,600 of 1932 discloses surface-oxidizing nickel by dipping it into nitric acid to produce a coating of nickel nitrate on the nickel, heating the nitrate coating until it has been converted to nickel oxide, immersing the resultant oxide coated nickel in a mixture of bleaching powder and water followed by reduction in hydrogen. While coatings produced by the decomposition of nickel nitrate are catalytically active, owing to the high solubility of nitrate salts and the rapidity of attack of nitric acid on catalytic metals such as nickel, difficulties are encountered in procuring a salt film of satisfactory uniformity and adherence by dipping the metal in nitric acid.

It is an object of this invention to provide a novel process for the production of bulk type catalysts having catalytically active surfaces of improved adherence and uniformity.

It is a further object of the invention to provide an improved acid treatment process for the production of catalysts. Other objects and advantages will appear hereinafter.

In accordance with the invention, bulk type metal catalyst such as nickel, cobalt, silver, and palladium, preferably nickel or cobalt, on a metallic or non-metallic support, is treated with an acid of phosphorus to produce on the surface of the support a layer of phosphorus-containing salt of the metal and the salt is then decomposed to convert it to a catalytically active form of the metal. In some cases, particularly when treating fresh metal supports, it is advantageous to incorporate in the acid of phosphorus a small amount of an oxidizing agent, e. g., a strong mineral acid such as sulfuric or nitric acid in order to promote attack on the metal and thus increase the depth of the salt film.

The feature of treating the catalyst with a solution of an acid of phosphorus possesses important advantages since it greatly simplifies the production of the catalyst and results in a catalytic layer of improved depth and adherence. Phosphoric and phosphorus acids attack metals such as nickel and cobalt less vigorously than nitric acid and the resultant hydrated salts are less soluble than the metal nitrates with the result that more adherent layers of the phosphorus-containing salts on the catalyst supports are obtained.

The invention may be employed both for the preparation of new catalysts and reactivation of spent catalysts and is particularly applicable to metal base bulk type catalysts, such as metal in the form of turnings, rings, wool, gauze, sheets and the like; metal in the form of oxide, e. g. sintered nickel oxide resulting from roasting nickel sulfide obtained in hydrofining crude hydrocarbons, as described in applicant's United States Patents 2,073,578 and 2,174,510, may be employed. Spent catalysts involving catalytic metal on a non-metallic support such as pumice, Alundum, silicon carbide, etc. may also be reactivated in accordance with the invention. In the case of spent catalysts containing poisons or other material deleteriously affecting the activity of the catalyst, such for example as sulfur, resinous material, carbonaceous material, etc., the catalyst may be given a treatment to remove such material. For example, the catalyst may be cleaned by treating it with steam or with a mixture of air and steam without substantial fusion of the surface layer to remove poisons such as sulfur and chlorine and carbonaceous material prior to treatment with an acid of phosphorus to form a phosphorus-containing salt layer thereon in accordance with this invention.

In treating the catalysts, either phosphoric or phosphorous acid may be employed. Preferably, phosphorous acid is utilized for treating metals such as cobalt which are subject to vigorous attack by acids and phosphoric acid is utilized in connection with metals such as nickel which are more resistant to acid attack. Solutions of the acids in any suitable solvent may be employed; aqueous acid solutions are ordinarily utilized, for example, in treating nickel, while for treating cobalt it may be desirable to utilize an organic solvent such as ethanol, methanol or acetone alone or admixed with water as the solvent for the acid in order to reduce ionization of the acid and thus control attack on the metal so as to promote building up an adherent salt film on the metal. The mole concentration per liter of the solution should be from ¼ to 5, preferably about 1 to 3 in case of phosphoric acid, and from ¼ to 5, preferably about ½ to 2 in the case of phosphorous acid. In some cases, particularly when fresh metal not readily attacked by phosphorus-containing acids is utilized, it is desirable to incorporate in the acid solution a small amount, preferably from 1 to 5 per cent of a strong mineral acid oxidizing agent such as nitric acid or sulfuric acid to promote attack on the metal. The coating of the catalytic metal salt may be converted to the catalytic metal hydroxide by treating it with a solution of alkali.

The following examples of the process of this invention are given for purposes of illustration; it will be understood the invention is not limited to the details of these examples.

Example I

Bare nickel turnings were immersed in a 3-mole-per-liter aqueous solution of phosphoric acid containing ½ mole per liter of nitric acid until the surface of the turnings became uniformly coated with a green layer of hydrated nickel phosphate. The turnings were then removed from the acid solution, washed with water and the phosphate coating was decomposed by subjecting the turnings to anodic oxidation in an electrolytic cell containing a 3 per cent solution of sodium carbonate as the electrolyte and a nickel sheet as the cathode, utilizing a current density of 6 milliamperes per square centimeter of cathode area, until the green coating on the turnings turned dark. Sodium phosphate or other alkaline salts may be employed instead of sodium carbonate in the electrolyte solution. The turnings may be water-washed or further treated before use.

Example II

Bare nickel turnings were immersed in a warm 4-moles-per-liter aqueous solution of phosphoric acid containing about ½ mole per liter of nitric acid until the surface of the turnings turned green. The turnings were then transferred to a 2-moles-per-liter aqueous solution of phosphoric acid containing 0.1 mole per liter of nitric acid and permitted to remain in this solution for several hours, i. e., until a deep adherent coating of nickel phosphate was formed on the turnings. The phosphate coating was decomposed by anodic oxidation as described in Example I.

Example III

Cobalt machinings were immersed in a 1-mole-per-liter solution of phosphoric acid in ethanol until the machinings had become coated with a red layer of cobalt phosphate. The treated machinings were then removed from the solution and the phosphate layer thereon decomposed by anodic oxidation as described in Example I.

Example IV

Nickel catalyst prepared by immersing unglazed broken porcelain of a particle size of from 4 to 8 mesh in molten nickel nitrate hexahydrate, boiling the mixture for several minutes, withdrawing and draining the nitrate-coated porcelain, and decomposing the nitrate to black nickel oxide in a current of air at about 300° C. was used for hydrofining as described in applicant's United States Patent No. 2,174,510 with the result that the nickel oxide was largely converted to nickel sulfide. The nickel sulfide was largely but incompletely converted to nickel oxide by a roasting procedure involving first passing steam alone over the catalyst and then replacing the steam with increasing volumes of air. After cooling, the roasted material is immersed in a heated, but non-boiling, aqueous acid solution containing about 15% $H_3PO_4$ and 1% $HNO_3$, until a substantial portion of the surface is converted to green nickel phosphate. After separation of the excess acid, the green nickel phosphate of the coated porcelain surfaces is substantially decomposed by treating with an alkaline solution of sodium hypochlorite.

Other foraminous nickel catalyst, including granular or pelleted catalytic nickel, may be similarly treated.

It will be understood the salt layer formed on the catalysts may be decomposed by other methods than anodic oxidation. For example, alkali or alkali chlorite or alkali hypochlorite may at least partially convert the salts to hydroxides or hydrated oxides. Such conversion of the salt to catalytically active form involves elimination of the acid radical of the salt.

Catalysts produced in accordance with the invention are suitable for use in various catalytic processes such as hydrogenation, dehydrogenation, desulfurization and hydrofining of organic materials and are particularly adapted for vapor phase reactions including hydrogenation of materials such as tar acids to produce cyclohexanol and methylcyclohexanols, hydrogenation of hydrocarbons, such as benzene, toluene, di-isobutylene and the like to produce cyclohexane, methylcyclohexane and iso-octane, and dehydrogenation of cyclohexanol and methylcyclohexanols to produce cyclohexanone and methylcyclohexanones. For example, in the hydrogenation of phenol to produce a mixture of cyclohexanol and cyclohexanone, a mixture of phenol vapor and excess hydrogen may be passed under pressure of about 10 atmospheres through a train of converters containing foraminous cages of the catalyst at a temperature of from 150° to 300° C.

Since certain changes may be made without departing from the scope of the invention, it is intended that the above shall be interpreted as illustrative and not in a limiting sense.

I claim:

1. The process of producing metal catalysts which comprises reacting a supporting base containing metal of the group consisting of nickel, cobalt, silver, and palladium, with a solution of an acid of phosphorus to form a layer of phosphorus-containing salt of the metal on the base and eliminating the acid radical from the salt to produce a catalytically active layer from said salt layer.

2. The process of preparing bulk metal catalysts which comprises reacting masses of metal of the group consisting of nickel, cobalt, silver, and palladium, with a solution containing an acid of phosphorus to form an adherent layer of phosphorus containing salt of the metal of the surface of said masses and decomposing said salt layer to form oxide of the metal.

3. The process of reactivating spent catalyst involving a support bearing spent catalytic metal of the group consisting of nickel, cobalt, silver, and palladium, which comprises treating the spent catalyst with a solution of an acid of phosphorus to convert the spent catalytic metal to a phosphorus-containing salt of the metal and decomposing the salt to form oxide of the metal.

4. The process of producing nickel hydrogenation catalysts which comprises reacting a base containing nickel with phosphoric acid to produce nickel phosphate adherent to the base and decomposing the nickel phosphate thus produced to form nickel oxide.

5. The process of producing nickel hydrogenation catalysts which comprises reacting a support bearing nickel with phosphoric acid to produce nickel phosphate adherent to the support and subjecting the layer of nickel phosphate thus produced to anodic oxidation to decompose said nickel phosphate to form nickel oxide.

6. The process of producing cobalt catalysts which comprises reacting a base containing cobalt with phosphorous acid to produce cobalt phosphite adherent to the base and decomposing the cobalt phosphite to form cobalt oxide.

7. The process of producing bulk cobalt catalysts which comprises reacting a base containing cobalt with a solution of an acid of phosphorus in an organic solvent to produce a layer of the cobalt salt of said acid on said base and decomposing said salt layer to form cobalt oxide.

MARION H. GWYNN.